United States Patent
Hsieh

(10) Patent No.: US 9,182,108 B2
(45) Date of Patent: Nov. 10, 2015

(54) FOLDABLE SUPPORT DEVICE FOR A STAND LAMP

(71) Applicant: HABITEX CORPORATION, Taipei (TW)

(72) Inventor: Pei-Lin Hsieh, Taipei (TW)

(73) Assignee: HABITEX CORPORATION, Taipei (TW)

( * ) Notice: Subject to any disclaimer, the term of this patent is extended or adjusted under 35 U.S.C. 154(b) by 138 days.

(21) Appl. No.: 14/020,224

(22) Filed: Sep. 6, 2013

(65) Prior Publication Data

US 2015/0069209 A1    Mar. 12, 2015

(51) Int. Cl.
| | |
|---|---|
| E04C 5/16 | (2006.01) |
| F21V 21/26 | (2006.01) |
| F16M 11/38 | (2006.01) |
| F16M 11/10 | (2006.01) |
| F21S 6/00 | (2006.01) |
| F21V 17/00 | (2006.01) |

(52) U.S. Cl.
CPC ............... *F21V 21/26* (2013.01); *F16M 11/10* (2013.01); *F16M 11/38* (2013.01); *F21S 6/003* (2013.01); *F21V 17/007* (2013.01)

(58) Field of Classification Search
CPC ........ F21V 21/26; F21V 21/36; F16M 11/38; F16M 11/2014; F16M 220/063; F16M 11/12; F21S 6/003; E04H 12/187
See application file for complete search history.

(56) References Cited

U.S. PATENT DOCUMENTS

| | | | | |
|---|---|---|---|---|
| 3,041,060 | A | * | 6/1962 | Jacobsen ..................... 267/177 |
| 3,543,019 | A | * | 11/1970 | Jacobsen ..................... 362/402 |
| 4,213,172 | A | * | 7/1980 | Scattolin et al. ............. 362/413 |
| 4,568,052 | A | * | 2/1986 | Solomon et al. ......... 248/281.11 |
| 4,953,822 | A | * | 9/1990 | Sharber et al. .......... 248/281.11 |
| 5,108,061 | A | * | 4/1992 | Vlasak ...................... 248/162.1 |
| 5,590,957 | A | * | 1/1997 | Chen .......................... 362/419 |
| 5,732,920 | A | * | 3/1998 | Reynoso et al. ............ 248/278.1 |
| 2003/0210553 | A1 | * | 11/2003 | Huang ......................... 362/402 |
| 2007/0247860 | A1 | * | 10/2007 | Franklin et al. ............. 362/431 |
| 2014/0169007 | A1 | * | 6/2014 | Polick et al. ................. 362/427 |

* cited by examiner

*Primary Examiner* — Brian D Mattei
(74) *Attorney, Agent, or Firm* — Faegre Baker Daniels LLP

(57) ABSTRACT

A foldable support device for a stand lamp includes a lower support member and an upper support member, each including a front support component and a rear support component parallel to and arranged behind the front support component. Each of the front and rear support components includes a bottom support rod having an upper end, and a top support rod having a lower end pivoted to the upper end of the bottom support rod such that the top support rod is foldable downwardly toward one of left and right sides of the bottom support rod and upwardly away from the bottom support rod.

10 Claims, 6 Drawing Sheets

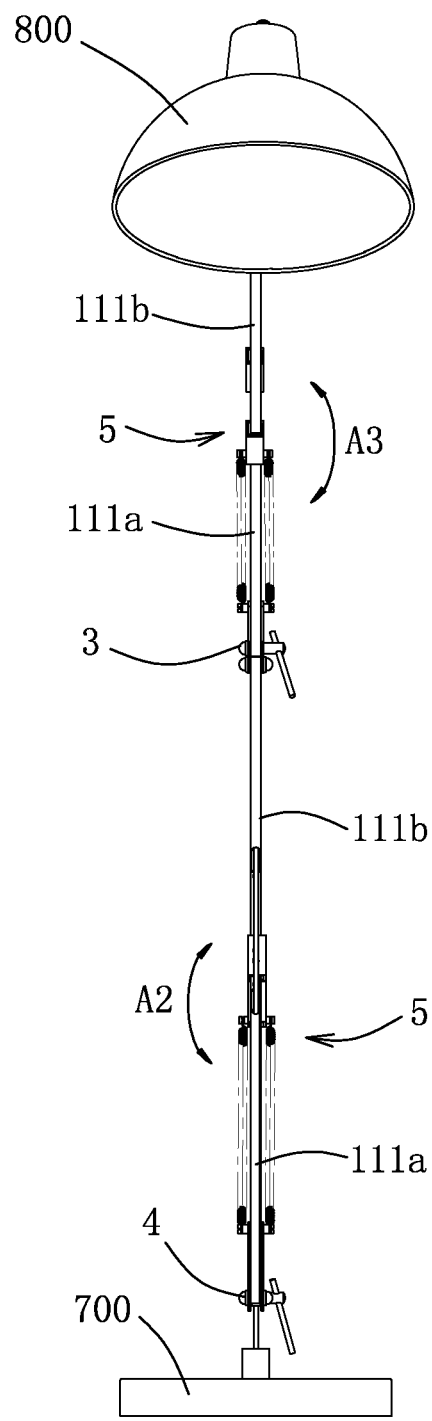
F I G. 3

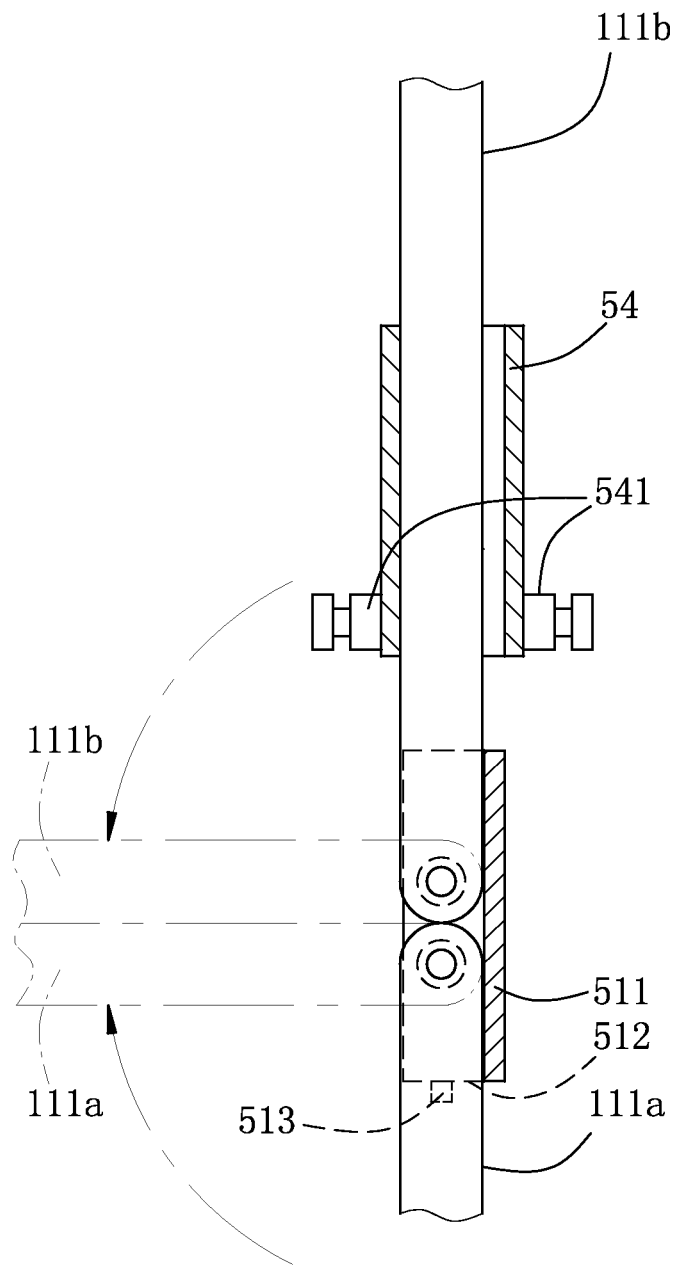
F I G. 5

US 9,182,108 B2

FOLDABLE SUPPORT DEVICE FOR A STAND LAMP

BACKGROUND OF THE INVENTION

1. Field of the Invention

The present invention relates to a support device for a stand lamp, more particularly to a foldable support device for a stand lamp.

2. Description of the Related Art

A conventional stand lamp generally includes a lamp base, a support device extending upwardly from the lamp base, and a lighting unit disposed on a top end of the support device. Since the conventional support device of the stand lamp has an elongated non-foldable shape, an elongated packaging box is required to pack the conventional support device. The larger packaging box may, as a result, incur more material and manufacturing costs, as well as inconvenience when transporting the same.

Another type of a conventional stand lamp further includes a hanging arm that is disposed at the support device and that is rotatable upwardly and downwardly with respect to the support device, such that height of the lighting unit, which is disposed at one end of the hanging arm, can be adjusted by rotation of the hanging arm relative to the support device.

However, the support device of this conventional stand lamp is still too long and is not foldable.

SUMMARY OF THE INVENTION

Therefore, an object of the present invention is to provide a foldable support device for a stand lamp that may alleviate the above drawbacks of the prior art.

Accordingly, a foldable support device for a stand lamp is adapted to be connected between a lamp base and a lighting unit of the stand lamp. The foldable support device includes a lower support member and an upper support member. The lower support member has an upper end and a lower end configured to connect to the lamp base. The upper support member has a lower end, and an upper end configured to connect to the lighting unit.

The lower end of the upper support member is pivoted to the upper end of the lower support member, such that the upper support member is foldable downwardly toward the lower support member and upwardly away from the lower support member. Each of the lower support member and the upper support member includes a front support component and a rear support component parallel to and arranged behind the front support component. Each of the front and rear support components includes a bottom support rod having an upper end, and a top support rod having a lower end. The lower end of the top support rod is pivoted to the upper end of the bottom support rod such that the top support rod is foldable downwardly toward one of left and right sides of the bottom support rod and upwardly away from the bottom support rod.

BRIEF DESCRIPTION OF THE DRAWINGS

Other features and advantages of the present invention will become apparent in the following detailed description of the preferred embodiment with reference to the accompanying drawings, of which:

FIG. 3 is a front view of the preferred embodiment;

FIG. 5 is a sectional view of the foldable support device taken along line V-V in FIG. 4.

DETAILED DESCRIPTION OF THE PREFERRED EMBODIMENT

Figure 1:
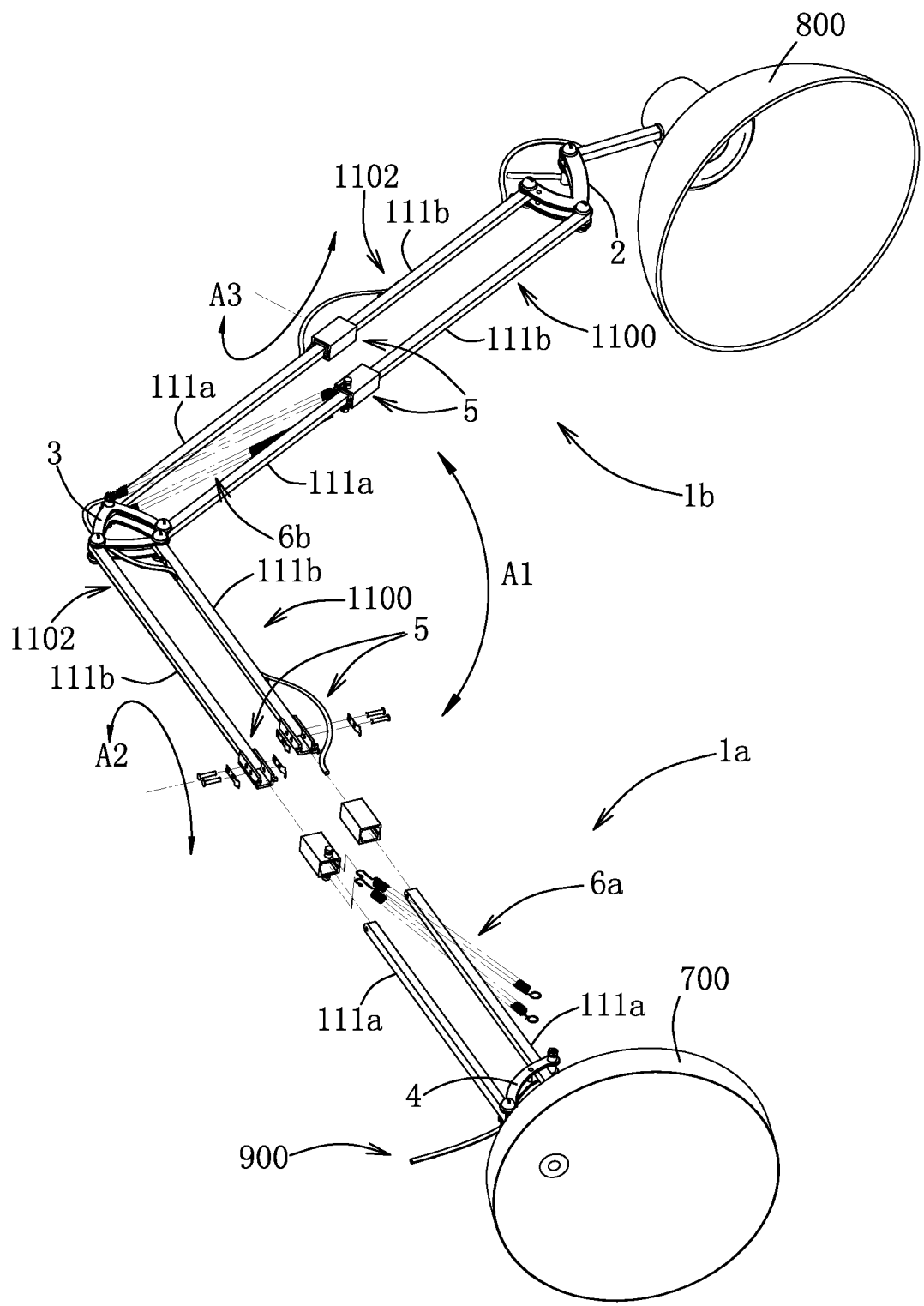
FIG. 1 is a partly exploded perspective view of a preferred embodiment of a foldable support device for a stand lamp according to the present invention.
Figure 2:
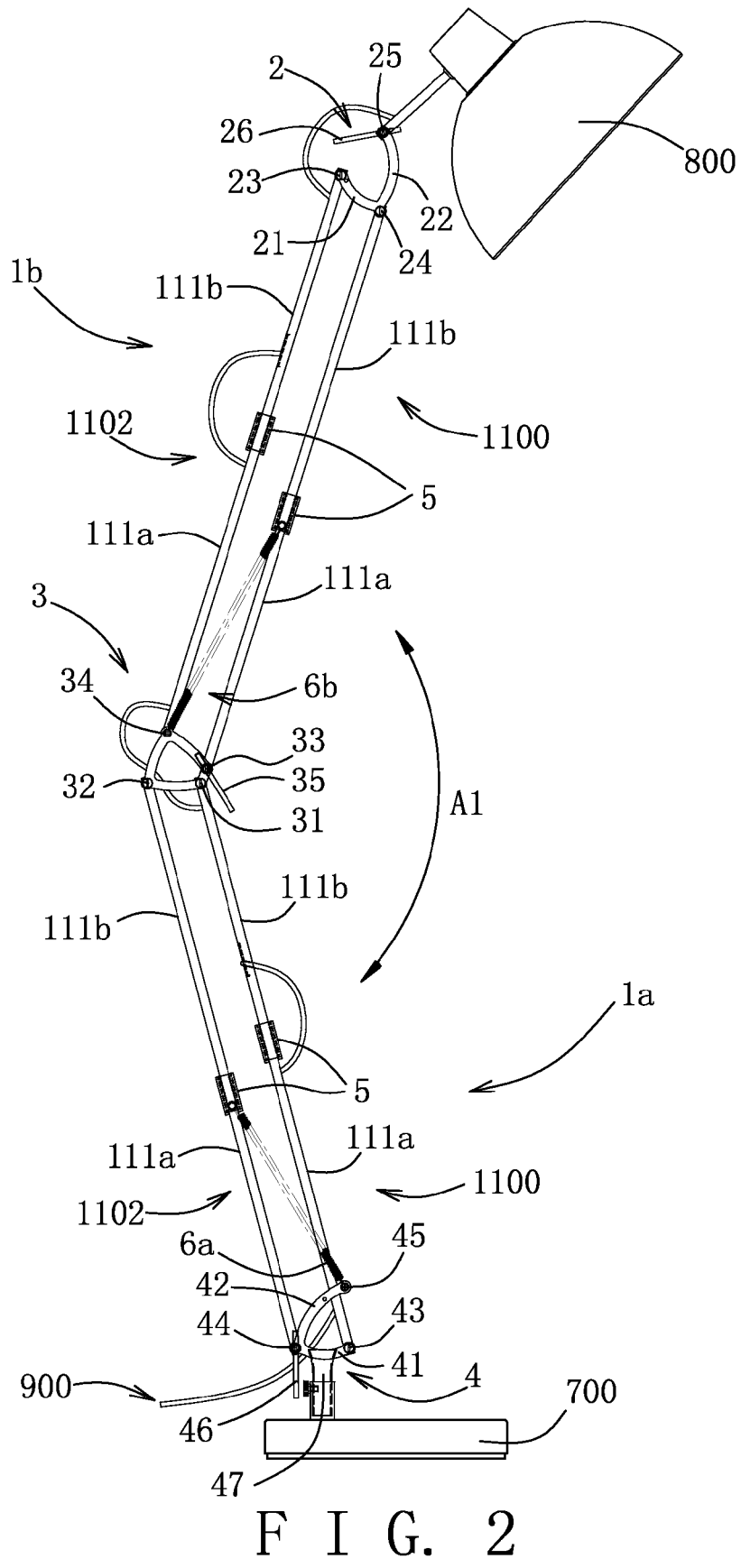
FIG. 2 is a side view of the preferred embodiment.

Referring to FIGS. 1 to 3, the preferred embodiment of a foldable support device according to the present invention is adapted to be connected between a lamp base 700 and a lighting unit 800 to form a stand lamp. The foldable support device includes a lower support member (1a) and an upper support member (1b). The lower support member (1a) has an upper end, and a lower end configured to connect to the lamp base 700. The upper support member (1b) has a lower end, and an upper end configured to connect to the lighting unit 800. The lower end of the upper support member (1b) is pivoted to the upper end of the lower support member (1a) such that the upper support member (1b) is foldable downwardly toward the lower support member (1a) and upwardly away from the lower support member (1a), as indicated by a two-headed arrow A1 in FIGS. 1 and 2, and height of the lighting unit 800 relative to the lamp base 700 may be correspondingly adjusted.

Each of the lower support member (1a) and the upper support member (1b) includes a front support component 1100 and a rear support component 1102 parallel to and arranged behind the front support component 1100. Each of the front and rear support components 1100, 1102 includes a bottom support rod (111a) having an upper end, and a top support rod (111b) having a lower end. The lower end of the top support rod (111b) is pivoted to the upper end of the bottom support rod (111a) such that the top support rod (111b) is foldable downwardly toward one of left and right sides of the bottom support rod (111a) and upwardly away from the one of the left and right sides of the bottom support rod (111a), as indicated by two-headed arrows A2 and A3 in FIGS. 1 and 3. Preferably, each of the bottom and top support rods (111a, 111b) of the foldable support device is formed of a rigid tube having a passageway therein that permits passage of a cable 900 therethrough, such that electricity may be delivered to the lighting unit 800. Since the feature of the present invention does not reside in how electricity is delivered, which is well-known to a person having ordinary skill in the art, a detailed description thereof will be omitted herein for the sake of brevity.

The foldable support device further includes a lighting connection component 2, a support connection component 3, a base connection component 4, a lower resilient unit (6a) and an upper resilient unit (6b).

The lighting connection component 2 includes a pair of rigid pivot connection plates that clamp rotatably the upper end of the upper support member (1b). The support connection component 3 includes a pair of rigid pivot connection plates that clamp rotatably the lower end of the upper support member (1b) and the upper end of the lower support member (1a). The base connection component 4 includes a pair of rigid pivot connection plates that clamp rotatably the lower end of the lower support member (1a). Therefore, each of the front support components 1100 may be kept parallel to the respective one of the rear support components 1102, and the upper support member (1b) is rotatable in directions indicated by the two-headed arrow A1 in a plane formed by the front and rear support components 1100, 1102.

The lighting connection component 2 is substantially V-shaped in this preferred embodiment, but is not limited thereto. The lighting connection component 2 is configured to connect pivotally the upper end of the upper support member (1*b*) to the lighting unit 800. Specifically, each of the pair of rigid pivot connection plates of the lighting connection component 2 has a first segment 21, a second segment 22, a first pivot point 23, a second pivot point 24 and a third pivot point 25. The first segment 21 has one end pivoted to the upper end of the top support rod (111*b*) of the rear support component 1102 of the upper support member (1*b*) at the first pivot point 23, and the other end pivoted to the upper end of the top support rod (111*b*) of the front support component 1100 of the upper support member (1*b*) at the second pivot point 24. The second segment 22 extends from the other end of the first segment 21 and is pivoted to the lighting unit 800 at the third pivot point 25. In this preferred embodiment, the lighting connection component 2 further includes a releasable lock 26 provided at the third pivot point 25 for locking releasably the lighting unit 800 at a desired tilt relative to the upper support member (1*b*).

The support connection component 3 is substantially trapezoidal in shape in this preferred embodiment, but is not limited thereto. The support connection component 3 is configured to connect pivotally the lower end of the upper support member (1*b*) to the upper end of the lower support member (1*a*). Specifically, each of the pair of rigid pivot connection plates of the support connection component 3 has a first pivot point 31, a second pivot point 32, a third pivot point 33 and a fourth pivot point 34. Each of the rigid pivot connection plates of the support connection component 3 is pivoted to the upper ends of the top support rods (111*b*) of the lower support member (1*a*) at the first and second pivot points 31, 32, and to the lower ends of the bottom support rods (111*a*) of the upper support member (1*b*) at the third and fourth pivot points 33, 34. The first and third pivot points 31, 33 are disposed in front of the second and fourth pivot points 32, 34, and a distance between the first and third pivot points 31, 33 is shorter than that between the second and fourth pivot points 32, 34. In this preferred embodiment, the support connection component 3 further includes a releasable lock 35 provided at the third pivot point 33 for locking releasably the upper support member (1*b*) at a desired tilt relative to the lower support member (1*a*). It is noted that the releasable lock 35 may be provided at the fourth pivot point 34 instead of at the third pivot point 33 in other embodiments of the present invention.

The shape of the base connection component 4 is substantially V-shaped in this preferred embodiment, which is similar to the shape of the lighting connection component 2. The base connection component 4 is configured to connect pivotally the lower end of the lower support member (1*a*) to the lamp base 700 such that the lower support member (1*a*) is foldable downwardly toward the lamp base 700 and upwardly away from the lamp base 700. Specifically, each of the pair of rigid pivot connection plates of the base connection component 4 has a first segment 41, a second segment 42, a front point 43, a rear point 44 and a third point 45 above the front and rear points 43, 44. The first segment 41 has one end pivoted to the lower end of the bottom support rod (111*a*) of the front support component 1100 of the lower support member (1*a*) at the front point 43, and the other end pivoted to the lower end of the bottom support rod (111*a*) of the rear support component 1102 of the lower support member (1*a*) at the rear point 44. The second segment 42 extends from the other end of the first segment 41. In this preferred embodiment, the base connection component 4 further includes a releasable lock 46 provided at the rear point 44 for locking releasably the lower support member (1*a*) at a desired tilt relative to the lamp base 700, and a plug 47 that is connected to and that extends downwardly from the first segments 41 of the rigid pivot connection plates for pluggable engagement with the lamp base 700. It is noted that the releasable lock 46 may be provided at the first point 43 instead of at the rear point 44 in other embodiments of the present invention.

Figure 4:
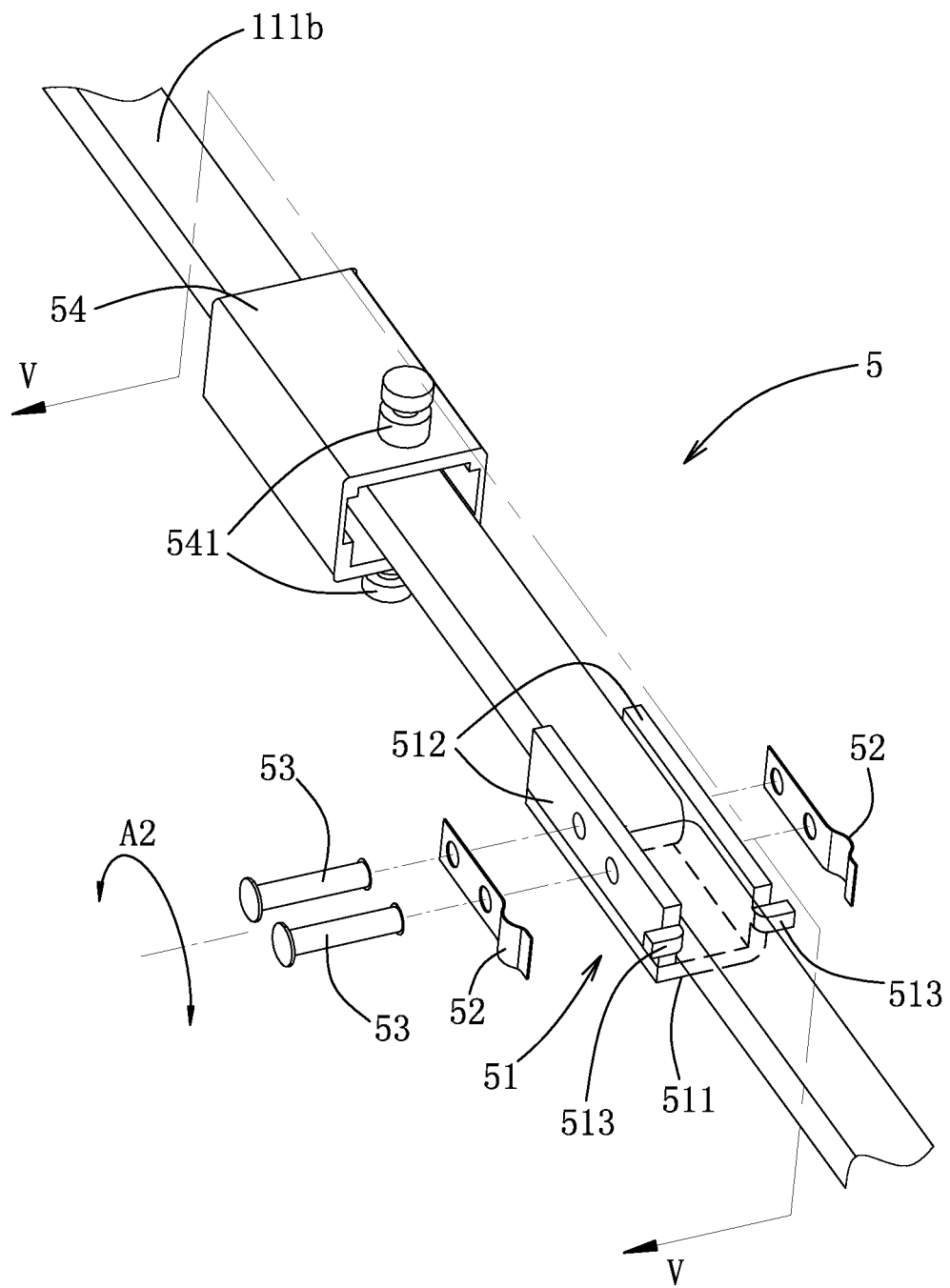
FIG. 4 is a fragmentary, partly exploded perspective view of the preferred embodiment, illustrating a pivot unit of the foldable support device.
Figure 6:
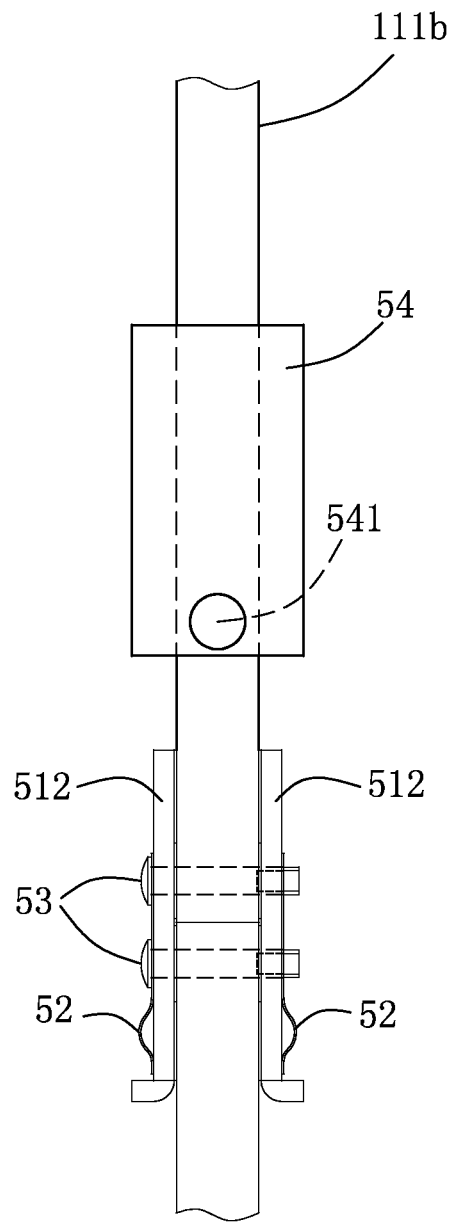
FIG. 6 is a side view of the part of the foldable support device shown in FIG. 5.

Referring to FIGS. 4 to 6, each of the front and rear support components 1100, 1102 of each of the lower and upper support members (1*a*, 1*b*) further includes a pivot unit 5 that connects pivotally the lower end of the top support rod (111*b*) to the upper end of the bottom support rod 111*a*. The rear support component 1102 of the lower support member (1*a*) and the pivot unit 5 thereof will be exemplified in the following description. FIG. 4 is a fragmentary, partly exploded perspective view of the preferred embodiment viewed from the same direction as FIG. 1, FIG. 5 is a sectional view of the foldable support device taken along line V-V in FIG. 4, and FIG. 6 is a side view of the part of the foldable support device shown in FIG. 5.

The rear support component 1102 of the lower support member (1*a*) further includes a pair of brake pieces 52 and a sleeve 54. The pivot unit 5 of the rear support component 1102 of the lower support member (1*a*) includes a main body 51 and a pair of pivot pins 53. The main body 51 includes a base wall 511 having left and right edges, and a pair of side walls 512 extending transversely and respectively from the left and right edges of the base wall 511 in a same direction. The base wall 511 and the side walls 512 cooperate to define a space that receives the lower end of the top support rod (111*b*) and the upper end of the bottom support rod (111*a*) and that opens in the direction in which the side walls 512 extend. The pair of brake pieces 52 are provided on an outer surface of the side walls 512, respectively. Each of the pivot pins 53 in this preferred embodiment is a rivet extending through the pair of brake pieces 52, through the pair of side walls 512, and through a respective one of the lower end of the top support rod (111*b*) and the upper end of the bottom support rod (111*a*), as shown in FIG. 6. With such configuration, the bottom and top support rods (111*a*, 111*b*) may pivot about the respective pivot pin 53 extending therethrough toward the direction that the space opens, as indicated by the two-headed arrow A2 in FIG. 4 and by the broken lines in FIG. 5. The bottom and top support rods (111*a*, 111*b*) may be folded until they contact each other, as illustrated by the broken lines in FIG. 5.

The sleeve 54 of the rear support component 1102 of the lower support member (1*a*) is sleeved on and movable along the respective top support rod (111*b*) in this preferred embodiment. Specifically, the sleeve 54 is movable to surround the respective pivot unit 5 when the lower end of the top support rod (111*b*) and the upper end of the bottom support rod (111*a*) are arranged to form a straight line in the space of the pivot unit 5 to thereby arrest relative folding movement between the bottom and top support rods (111*a*, 111*b*). The main body 51 of the pivot unit 5 has a lower end proximate to the upper end of the bottom support rod (111*a*) and is provided with a pair of stops 513 disposed outwardly of the space. Each of the stops 513 extends from a respective one of the side walls 512. Each of the brake pieces 52 has a protruding shape adjacent to the lower end of the main body 51. Therefore, when the sleeve 54 is moved downwardly to surround the pivot unit 5, the brake pieces 52 are disposed to brake movement of the sleeve 54, and the stops 513 are disposed to limit further movement of the sleeve 54.

The aforesaid description is applicable to each of the pivot units 5 of the present invention, the only difference residing in that the spaces of the pivot units 5 of the front and rear support components 1100, 1102 of the lower support member (1a) open to the left, and the spaces of the pivot units 5 of the front and rear support components 1100, 1102 of the upper support member (1b) open to the right. Therefore, folding movement of the lower support member (1a) is on the left side of the foldable support device and folding movement of the upper support member (1b) is on the right side of the foldable support device. With such configuration, if the foldable support device of this preferred embodiment is folded for placing into a small packaging box, components of the present invention may be prevented from interfering each other. It is noted that, even when all of the spaces of the pivot units 5 of the front and rear support components 1100, 1102 of the lower and upper support member (1a, 1b) open in the same direction, the size of the packaging box for the foldable support device of the present invention may still be small compared to the prior art.

Referring to FIGS. 1, 2 and 4, each of the lower resilient unit (6a) and the upper resilient unit (6b) includes a pair of springs, but may include only one spring in other embodiments of the present invention. The sleeve 54 of the rear support component 1102 of the lower support member (1a) is further formed with a pair of protruding components 541 on the left and right sides thereof for connecting with the springs. Specifically, each spring of the lower resilient unit (6a) interconnects the respective protruding component 541 of the sleeve 54 of the rear support component 1102 of the lower support member (1a) and the third point 45 of the respective rigid pivot connection plate of the base connection component 4. The springs pull the sleeve 54 to move downwardly to surround the pivot unit 5 when the lower end of the top support rod (111b) and the upper end of the bottom support rod (111a) are arranged to form a straight line in the space of the pivot unit 5 to thereby arrest relative folding movement between the bottom and top support rods (111a, 111b). When the springs of the lower resilient unit (6a) are removed from the sleeve 54, the sleeve 54 may be moved upwardly to enable relative folding movement between the bottom and top support rods (111a, 111b). The upper resilient unit (6b) interconnects the respective protruding component 541 of the sleeve 54 of the front support component 1100 of the upper support member (1b) and the fourth pivot point 34 of the respective rigid pivot connection plate of the support connection component 3. Since the function of the upper resilient unit (6b) is similar to that of the lower resilient unit (6a), further details thereof will be omitted herein for the sake of brevity.

To conclude, by virtue of the pivot units 5 and foldable configurations of the lower and upper support members (1a, 1b) according to the present invention, length of the folded support members (1a, 1b) may be significantly shortened. Consequently, material and manufacturing cost of the packaging box for the foldable support device may be reduced. Moreover, by virtue of the sleeves 54 and the resilient units (6a, 6b) according to the present invention, stability of the foldable support device may be ensured without requiring a complicated configuration.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A foldable support device for a stand lamp, said foldable support device being adapted to be connected between a lamp base and a lighting unit of the stand lamp and comprising:
   a lower support member having a lower end configured to connect to the lamp base, and an upper end; and
   an upper support member having an upper end configured to connect to the lighting unit, and a lower end;
   said lower end of said upper support member being pivoted to said upper end of said lower support member such that said upper support member is foldable downwardly toward said lower support member and upwardly away from said lower support member;
   wherein each of said lower support member and said upper support member includes a front support component and a rear support component parallel to and arranged behind said front support component;
   wherein each of said front and rear support components of each of said lower and upper support members includes a bottom support rod having an upper end, a top support rod having a lower end pivoted to said upper end of said bottom support rod such that said top support rod is foldable downwardly toward one of left and right sides of said bottom support rod and upwardly away from said one of said left and right sides of said bottom support rod, and a pivot unit connecting pivotally said lower end of said top support rod to said upper end of said bottom support rod;
   wherein said pivot unit includes a main body, and said main body includes a base wall having left and right edges, and a pair of side walls extending transversely and respectively from said left and right edges of said base wall in a same direction;
   wherein said base wall and said side walls cooperate to define a space that receives said lower end of said top support rod and said upper end of said bottom support rod and that opens in the direction in which said side walls extend;
   wherein said spaces of said pivot units of said front and rear support components of said lower support member open in the same direction, and said spaces of said pivot units of said front and rear support components of said upper support member open in the same direction;
   wherein said pivot unit further includes a pair of pivot, pins, each extending through said side walls and through a respective one of said lower end of said top support rod and said upper end of said bottom support rod;
   wherein each of said front and rear support components of each of said lower and upper support members further includes a sleeve sleeved on and movable along one of said bottom and top support rods, and said sleeve is movable to surround said pivot unit when said lower end of said top support rod and said upper end of said bottom support rod are arranged to form a straight line in said space of said pivot unit to thereby arrest relative folding movement between said bottom and top support rods;
   wherein said sleeve is sleeved on and is movable along said top support rod, said main body of said pivot unit has a lower end proximate to said upper end of said bottom support rod and provided with at least one stop that is disposed outwardly of said space, and each of said front and rear support components of each of said lower and upper support members further includes at least one brake piece provided on an outer surface of said main body and having a protruding shape adjacent to said lower end of said main body; and wherein, when said sleeve is moved to surround said pivot unit, said at least one brake piece is disposed to brake movement of said sleeve, and said at least one stop is disposed to limit further movement of said sleeve.

2. The foldable support device as claimed in claim 1, wherein the direction in which said spaces of said pivot units of said front and rear support components of said lower support member open is opposite to the direction in which said spaces of said pivot units of said front and rear support components of said upper support member open.

3. The foldable support device as claimed in claim 1, wherein:
   said main body of said pivot unit is provided with two of said stops, each of which extends from a respective one of said side walls; and
   each of said front and rear support components of each of said lower and upper support members includes two of said brake pieces, each of which is provided on an outer surface of a respective one of said side walls.

4. The foldable support device as claimed in claim 1, further comprising:
   a lower resilient unit interconnecting said lower end of said lower support member and said sleeve of one of said front and rear support components of said lower support member; and
   an upper resilient unit interconnecting said lower end of said upper support member and said sleeve of one of said front and rear support components of said upper support member.

5. The foldable support device as claimed in claim 4, further comprising a base connection component configured to connect pivotally said lower end of said lower support member to the lamp base such that said lower support member is foldable downwardly toward the lamp base and upwardly away from the lamp base, said lower resilient unit interconnecting said base connection component and said sleeve of one of said front and rear support components of said lower support member.

6. The foldable support device as claimed in claim 5, wherein
   said base connection component includes a pair of rigid pivot connection plates that clamp said lower end of said lower support member,
   said rigid pivot connection plates being pivoted to lower ends of said bottom support rods at front and rear points, and being connected to said lower resilient unit at a third point above said front and rear points,
   said base connection component further including a plug connected to said rigid pivot connection plates for pluggable engagement with the lamp base, and
   said base connection component further including a releasable lock provided at one of said front and rear points for locking releasably said lower support member at a desired tilt relative to the lamp base.

7. The foldable support device as claimed in claim 4, further comprising a support connection component configured to connect pivotally said lower end of said upper support member to said upper end of said lower support member, said upper resilient unit interconnecting said support connection component and said sleeve of one of said front and rear support components of said upper support member.

8. The foldable support device as claimed in claim 7, wherein
   said support connection component includes a pair of rigid pivot connection plates that clamp said lower end of said upper support member and said upper end of said lower support member,
   said rigid pivot connection plates being pivoted to upper ends of said top support rods of said lower support member at first and second pivot points, and to lower ends of said bottom support rods of said upper support member at third and fourth pivot points,
   said first and third pivot points being disposed in front of said second and fourth pivot points,
   a distance between said first and third pivot points being shorter than that between said second and fourth pivot points,
   said upper resilient unit being connected to said support connection component proximate to said fourth pivot point, and
   said support connection component further including a releasable lock provided at one of said third and fourth pivot points for locking releasably said upper support member at a desired tilt relative to said lower support member.

9. The foldable support device as claimed in claim 1, further comprising a lighting connection component configured to connect pivotally said upper end of said upper support member to the lighting unit,
   said lighting connection component including a pair of rigid pivot connection plates that clamp said upper end of said upper support member,
   said rigid pivot connection plates being pivoted to upper ends of said top support rods at first and second pivot points, and to be pivoted to the lighting unit at a third pivot point, and
   said lighting connection component further including a releasable lock provided at said third pivot point for locking releasably the lighting unit at a desired tilt relative to said upper support member.

10. A foldable support device for a stand lamp, said foldable support device being adapted to be connected between a lamp base and a lighting unit of the stand lamp and comprising:
   a lower support member having a lower end configured to connect to the lamp base, and an upper end; and
   an upper support member having an upper end configured to connect to the lighting unit, and a lower end;
   said lower end of said upper support member being pivoted to said upper end of said lower support member such that said upper support member is foldable downwardly toward said lower support member and upwardly away from said lower support member;
   wherein each of said lower support member and said upper support member includes a front support component and a rear support component parallel to and arranged behind said front support component;
   wherein each of said front and rear support components of each of said lower and upper support members includes a bottom support rod having an upper end, a top support rod having a lower end pivoted to said upper end of said bottom support rod such that said top support rod is foldable downwardly toward one of left and right sides of said bottom support rod and upwardly away from said one of said left and right sides of said bottom support rod, and a pivot unit connecting pivotally said lower end of said top support rod to said upper end of said bottom support rod;
   wherein said pivot unit includes a main body, and said main body includes a base wall having left and right edges, and a pair of side walls extending transversely and respectively from said left and right edges of said base wall in a same direction;

wherein said base wall and said side walls cooperate to define a space that receives said lower end of said top support rod and said upper end of said bottom support rod and that opens in the direction in which said side walls extend;

wherein said spaces of said pivot units of said front and rear support components of said lower support member open in the same direction, and said spaces of said pivot units of said front and rear support components of said upper support member open in the same direction;

wherein said pivot unit further includes a pair of pivot pins, each extending through said side walls and through a respective one of said lower end of said top support rod and said upper end of said bottom support rod;

wherein each of said front and rear support components of each of said lower and upper support members further includes a sleeve sleeved on and movable along one of said bottom and said top support rod and said upper end of said bottom support rod are arranged to form a straight line in said space of said pivot unit to thereby arrest relative folding movement between said bottom and top support rods; and wherein said support connection component includes a pair of rigid pivot connection plates that clamp said lower end of said upper support member and said upper end of said lower support member, said rigid pivot connection plates being pivoted to upper ends of said top support rods of said lower support member at first and second pivot points, and to lower ends of said bottom support rods of said upper support member at third and fourth pivot points, said first and third pivot points being disposed in front of said second and fourth pivot points, a distance between said first and third pivot points being shorter than that between said second and fourth pivot points, said upper resilient unit being connected to said support connection component proximate to said fourth pivot point, and said support connection component further including a releasable lock provided at one of said third and fourth pivot points for locking releasably said upper support member at a desired tilt relative to said lower support member.

* * * * *